United States Patent
MacPherson

(10) Patent No.: US 8,488,577 B1
(45) Date of Patent: Jul. 16, 2013

(54) APPARATUS FOR CONTROLLING THE AVAILABILITY OF INTERNET ACCESS TO APPLICATIONS

(75) Inventor: Luke David MacPherson, Pyrmont (AU)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/489,756

(22) Filed: Jun. 6, 2012

(51) Int. Cl.
*H04W 4/00* (2009.01)

(52) U.S. Cl.
USPC .......................................................... 370/338

(58) Field of Classification Search
None
See application file for complete search history.

(56) References Cited

U.S. PATENT DOCUMENTS

| | | | |
|---|---|---|---|
| 2008/0114983 A1* | 5/2008 | Sherkin et al. | 713/171 |
| 2009/0207817 A1* | 8/2009 | Montemurro et al. | 370/338 |

* cited by examiner

*Primary Examiner* — Jianye Wu
(74) *Attorney, Agent, or Firm* — MH2 Technology Law Group, LLP

(57) ABSTRACT

Embodiments relate to systems and methods for controlling network access that includes receiving, at a network layer of a protocol stack of a mobile computing device comprising two or more communications interfaces, one or more data packets from an application executing on the mobile computing device, wherein the two or more communication interfaces comprise a cellular communication interface and a wireless network interface; identifying, at the network layer upon receiving the data packet, one or more rules that specify at least one of a plurality of networks to utilize to transmit the data packet, based on the one or more rules, selecting, in the network layer, a communication interface from the two or more communications interfaces associated with the at least one of the plurality of networks for transmitting the one or more data packets.

8 Claims, 4 Drawing Sheets

APPARATUS FOR CONTROLLING THE AVAILABILITY OF INTERNET ACCESS TO APPLICATIONS

TECHNICAL FIELD

The present teachings relate generally to systems and methods for operation of a multi-mode wireless communication device and more particularly to systems and methods for controlling the availability of internet access of applications on multi-mode wireless communication devices.

BACKGROUND

Devices including mobile telephones, smart phones, personal digital assistance (PDAs) with wireless communication capabilities, two-way pagers and the like can communicate using more than one wireless network, wireless communication protocols, or wireless technologies. For example, dual or multi-mode devices, such as devices with radio access technologies can provide access to wireless local area networks (WLAN) (e.g. access technologies under the Wi-Fi brand), wireless metropolitan area network (WMAN) (e.g. access technologies under the WiMAX brand) and wireless wide area networks (WWAN) (e.g. cellular technologies like GSM/GPRS EDGE, UTMS, HSPA, CDMA, WCDMA, etc.). Selection among the different radio access technologies may be driven by the different properties of the technologies such as bandwidth, range, cost, and power consumption, among other considerations. Selection may be an initial selection of a technology or a re-selection/evaluation particularly in view of a change to real-time conditions.

The determination to use a particular communication protocol or technology over another protocol or technology for a particular device or for an application running on the device can be based on a number of factors. For instance, there may be a cost difference and/or quality considerations associated with the use of one particular protocol or technology that may make the use more desirable than the other protocol or technology. It is therefore desirable to have a mechanism that seeks to optimize communications on a packet-by-packet basis for multi-mode capable devices, that is, that seeks to improve communications for multi-mode capable devices.

SUMMARY

In accordance with aspects of the present disclosure, a method of controlling network access is disclosed. The method can include receiving a data packet at a network layer of a protocol stack from an application executing on a computing device; identifying, upon receiving the data packet, one or more rules that specify at least one of a plurality of networks to utilize to transmit the data packet, wherein the one or more rules are based on at least one of a type of the at least one of the plurality of networks, an operating state of the computing device, and the application; and selecting at least one communication interface associated with the at least one of the plurality of networks for transmitting the data packet based on the one or more rules.

In some aspects, the method can further include defining a routing table, wherein the routing table is operable to match the one or more data packets with one of the plurality of networks on which the data packets can be transmitted.

In some aspects, the method can further include modifying a routing table based the one or more rules stored in a rules engine.

In some aspects, the one or more rules can comprise a bandwidth on the communication interface, a time to send the data packet, a delay or an estimated delay, a power consumption required, a cost to send the data packet, a bandwidth quota remaining with a service provider, an accumulated cost on a given account, an exclusion of specific times and dates, a battery life remaining on a device, an estimated time until a user next interacts with the device, and/or a transmission cost per byte.

In some aspects, claim 1, the plurality of networks can comprise wireless local area networks (WLAN), wireless metropolitan area network (WMAN), and wireless wide area networks (WWAN).

In some aspects, the m 5, the wireless local area networks (WLAN) can comprise access technologies using Wi-Fi. In some aspects, the claim 5, the wireless metropolitan area network (WMAN) can comprise access technologies using WiMAX. In some aspects, the wireless wide area networks (WWAN) can comprise access technologies using cellular technologies, wherein the cellular technologies comprise GSM/GPRS EDGE, UTMS, HSPA, CDMA, and WCDMA.

In accordance with aspects of the present disclosure, a device is disclosed that can include at least two communication interfaces configured to enable the device to communicate in at least two different modes of communication; a processor and a memory coupled to the processor for storing instructions for execution by the processor, the instructions comprising receiving a data packet at a network layer of a protocol stack from an application executing on the device; identifying, upon receiving the data packet, one or more rules that specify at least one of a plurality of networks to utilize to transmit the data packet, wherein the one or more rules are based on at least one of a type of the at least one of the plurality of networks, an operating state of the computing device, and the application; and selecting at least one communication interface associated with the at least one of the plurality of networks for transmitting the data packet based on the one or more rules.

In accordance with aspects of the present disclosure, a computer program product is disclosed that can comprise a computer-readable medium having a computer readable program code embodied therein, said computer readable program code adapted to be executed by a processor to implement a method comprising: receiving a data packet at a network layer of a protocol stack from an application executing on a computing device; identifying, upon receiving the data packet, one or more rules that specify at least one of a plurality of networks to utilize to transmit the data packet, wherein the one or more rules are based on at least one of a type of the at least one of the plurality of networks, an operating state of the computing device, and the application; and selecting at least one communication interface associated with the at least one of the plurality of networks for transmitting the data packet based on the one or more rules.

DESCRIPTION OF DRAWINGS

The accompanying drawings, which are incorporated in and constitute a part of this specification, illustrate embodiments of the present teachings and together with the description, serve to explain the principles of the present teachings.

DESCRIPTION OF EMBODIMENTS

In general, aspects of the present disclosure relate to one or more communication procedures for devices that are arranged to communicate with more than one communication networks or network communication modes (e.g. WLAN such as Wi-Fi, WMAN such as WiMAX and WWAN such as GSM/GPRS cellular and wired modes (e.g. LAN, among others)). A data packet can be received at a network layer from an application and analyzed to determine on which communication network the data packet is to be transmitted. This analysis is performed on per packet basis and can be based on a variety of factors including constraints imposed on or by an application, a network, a device and/or a user. These constraints can be embodied in one or more rules that can be stored in a rules engine and can be used to modify a routing table that is used to determine which communication interface the data packet is to be prepared for transmission. The one or more constraints can include a bandwidth on the communication interface, a time to send the data packet, a delay or an estimated delay, a power consumption required, a cost to send the data packet, a bandwidth quota remaining with a service provider, an accumulated cost on a given account, an exclusion of specific times and dates, a battery life remaining on a device, an estimated time until a user next interacts with the device, and/or a transmission cost per byte.

Reference will now be made in detail to exemplary embodiments of the present teachings, which are illustrated in the accompanying drawings. Where possible the same reference numbers will be used throughout the drawings to refer to the same or like parts.

Figure 1:
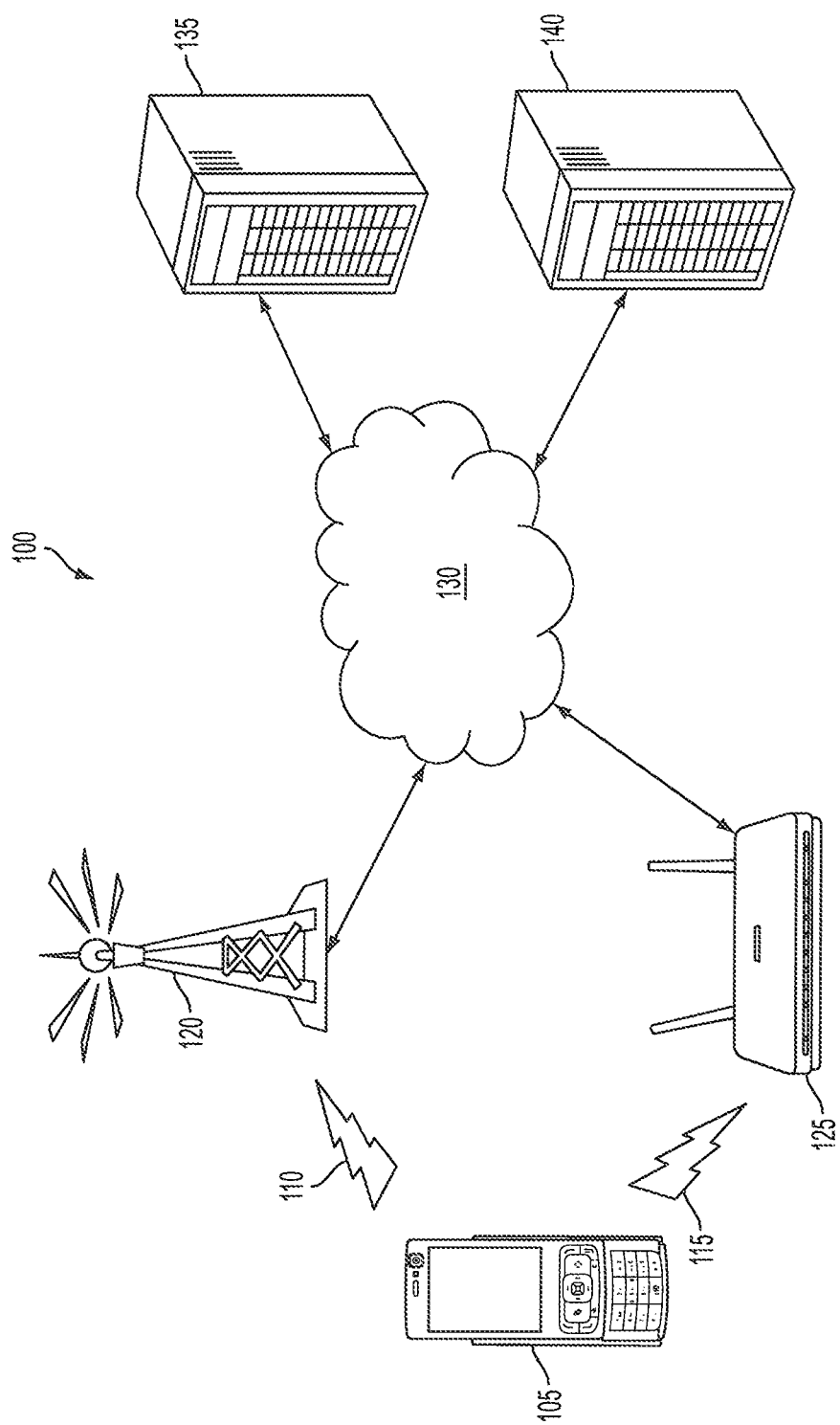
FIG. 1 shows a block diagram showing an example communication network in accordance with aspects of the present disclosure.

Referring to FIG. 1, a simplified example communication network 100 is illustrated generally. For simplicity, various network infrastructure (e.g. for wireless carriers and enterprises, including gateways, firewalls, etc.), application gateways, gateway servers, provisioning servers, discovery servers, and application repositories are not shown, but can be included in network 100 as would be understood by those skilled in the art. Communication network 100 can comprise mobile wireless communication device, or simply mobile device 105, coupled for wireless communication via at least one wireless communication network (e.g. 110 and 115) to at least one of a plurality of backend servers 135 and 140. For simplicity, the drawings and description refer to a single mobile wireless communication device 105 whereas in practice and as would be understood to a person of ordinary skill, a plurality of such devices are typically present in the network 100. A particular mobile device 105 may comprise various computing devices such as a desktop computer, a laptop or other portable computer, a smart phone, a personal digital assistant (PDA), and the like.

In the example network 100, mobile device 105 can be capable of wireless communication in accordance with WLAN or WMAN (e.g. Wi-Fi or WiMAX) and WWAN (e.g. GSM Cellular) standards. As such, it may communicate through cellular network 110 and base station 120 coupled to network 130, such as the Internet and/or through WLAN or WMAN network 115 and access point 125 also coupled to network 130. Servers 135 and 140 can also be coupled to network 130. Though shown as communicating through the public network 130, such as the Internet, other network configurations will be apparent to persons of ordinary skill in the art. For example, one or more backend servers 135 and 140 may be accessible to device 105 over a LAN, such as an enterprise LAN (not shown).

Figure 2:
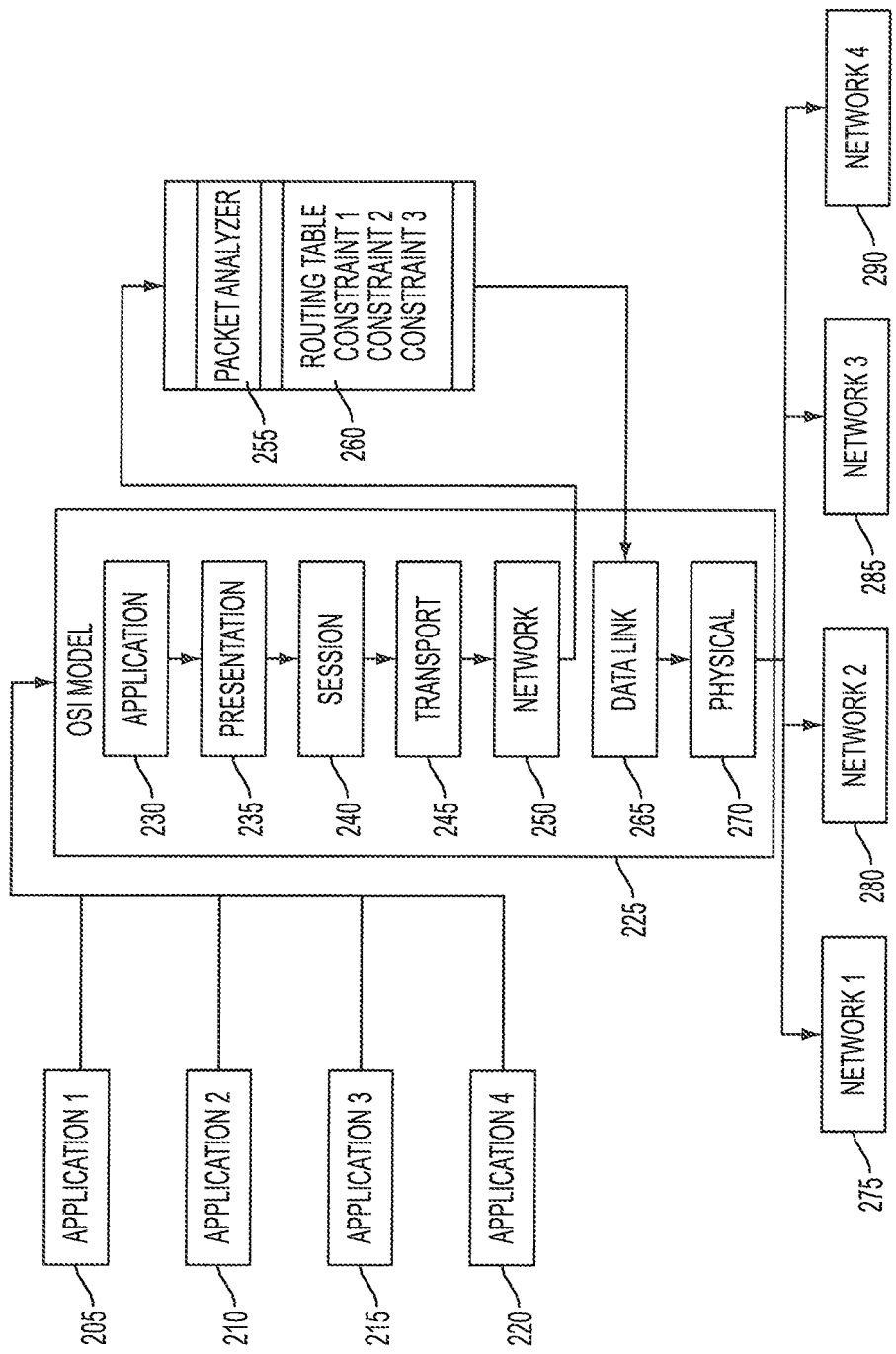
FIG. 2 shows an example diagram according to aspects of the present disclosure.

FIG. 2 illustrates, in accordance with an embodiment thereof, a block diagram of a data routing procedure for multi-mode operations of device 105 for communication network infrastructure of FIG. 1. Device 105 can run a plurality of applications that can use more than one network and/or network interface. For example, the applications can include a first application 205, a second application 210, a third application 215, and a fourth application 220. Although four applications are shown and described, more or less than four applications can be loaded and run on device 105. For example, one application may be a streaming application, such as voice-over-IP or video communications application, which requires continuous or near-continuous use of the network or network interface. Another application can be application that can require less network access, such as an application that only periodically requires network access.

Data from applications 205, 210, 215, and 220 can be directed to protocol stack 225 under control of a processor (not shown). Protocol stack can be an OSI stack can include application layer 230, presentation layer 235, session layer 240, transport layer 245, network layer 250, data link layer 265, and physical layer 270. As the data proceeds through the various layers of the stack, the data can be analyzed after network layer 250 and before data link layer 265 by packet analyzer 255. Packet analyzer 255 can be equipped with logic and/or procedures to analyze each data packet passing through network layer 250 using one or more constraints stored in routing table 260. After the data packet is analyzed by packet analyzer 255, the data packet can proceed to data link layer 265 to be prepared and/or formatted for transmission by physical layer 270 using one or more network interfaces 275, 280, 285, and 290.

In some aspects, packet analyzer 255 or another packet analyzer can be arranged in another node or portion of the network to preform and/or assist in the packet analysis. For example, packet analyzer 255 can reside on device 105, on the network or on both device and network. By allowing the packet analysis to be performed wholly on the network or with assistance from device 105, the computational and/or power requirements needed by device 105 can be reduced. In some aspects, packet analyzer 255 can be arranged to perform the packet analysis using different requirements. For example, packet analysis can be performed on a group of packets or can be performed on an application-by-application basis. For example, packet analysis can be initiated upon a determination of a change in data from one application to another.

Figure 3:
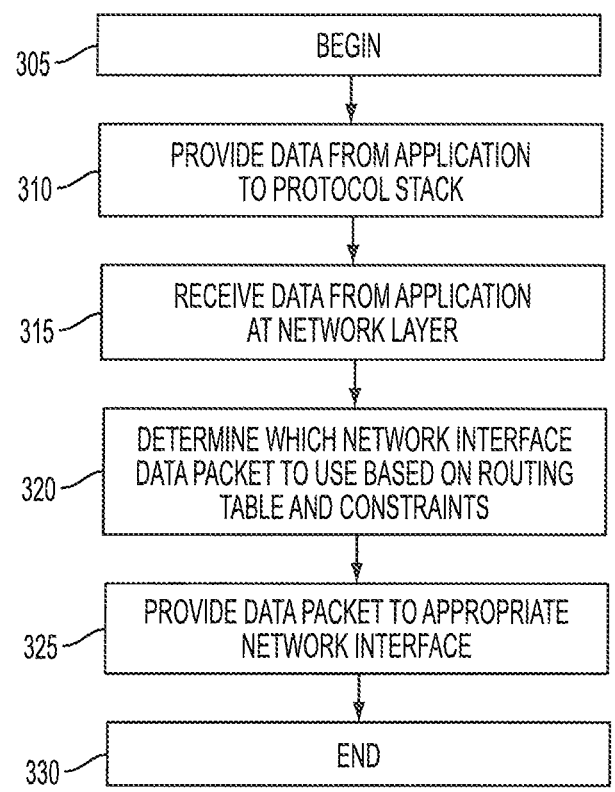
FIG. 3 shows an example flowchart according to aspect of the present disclosure.

FIG. 3 is an example process by which the data from one or more applications can be analyzed and determined on which network interface the data can be transmitted. The process begins at 305 and proceeds to 310 where one or more applications provide data to protocol stack for preparation and formatting for transmission on one or more networks by one or more network interfaces. At 315, data packets are received at the network layer and are passed to packet analyzer for analysis. At 320, each data packet is analyzed to determine which network interface the data packet is to be prepared based on the routing table and the one or more constraints. At 325, each data packet is then prepared and/or formatted for transmission onto the determined network and the process can end at 330.

The one or more rules or constraints can comprise a bandwidth on the communication interface, a time to send the data packet, a delay or an estimated delay, a power consumption required, a cost to send the data packet, a bandwidth quota remaining with a service provider, an accumulated cost on a given account, an exclusion of specific times and dates, a battery life remaining on a device, an estimated time until a user next interacts with the device, and/or a transmission cost per byte. In some aspects, the user and/or device or network administrator can choose the priority for the constraints with which the device is operable. For example, if low transmission latency is desired over cost or power consumption, then this constraint can be chosen to have priority over the other constraints. If more than one constraint has the same priority, the user or a network or device administrator can determine or select which constraint dominates. In some aspects, this can be determined or selected on an application-by-application basis or on a session-by-session basis.

By way of a non-limiting example, device 105 can be operable to communicate over three networks using respective network interfaces. The first network can be a WiFi network, the second network can be a 4G cellular network, and the third network is a 3g cellular network. The constraints chosen by the user may include battery life of the device, cost to transmit data, and range of the network. If the device 105 is using a first application to stream live video and a second application to send email, the most desired network may be the WiFi network. However, if the cost to use the WiFi network is higher than both the 4g and 3g cellular networks, the user may wish to use the cheaper networks for the first application and the more expensive network for the second application, preferably the 4g network. However, if the 4g cellular network has limited range and higher battery demand, the device 105 may be configured to select the 3g cellular network to enable greater roaming and prolong the battery live of the device 105 for one or both applications.

Figure 4:
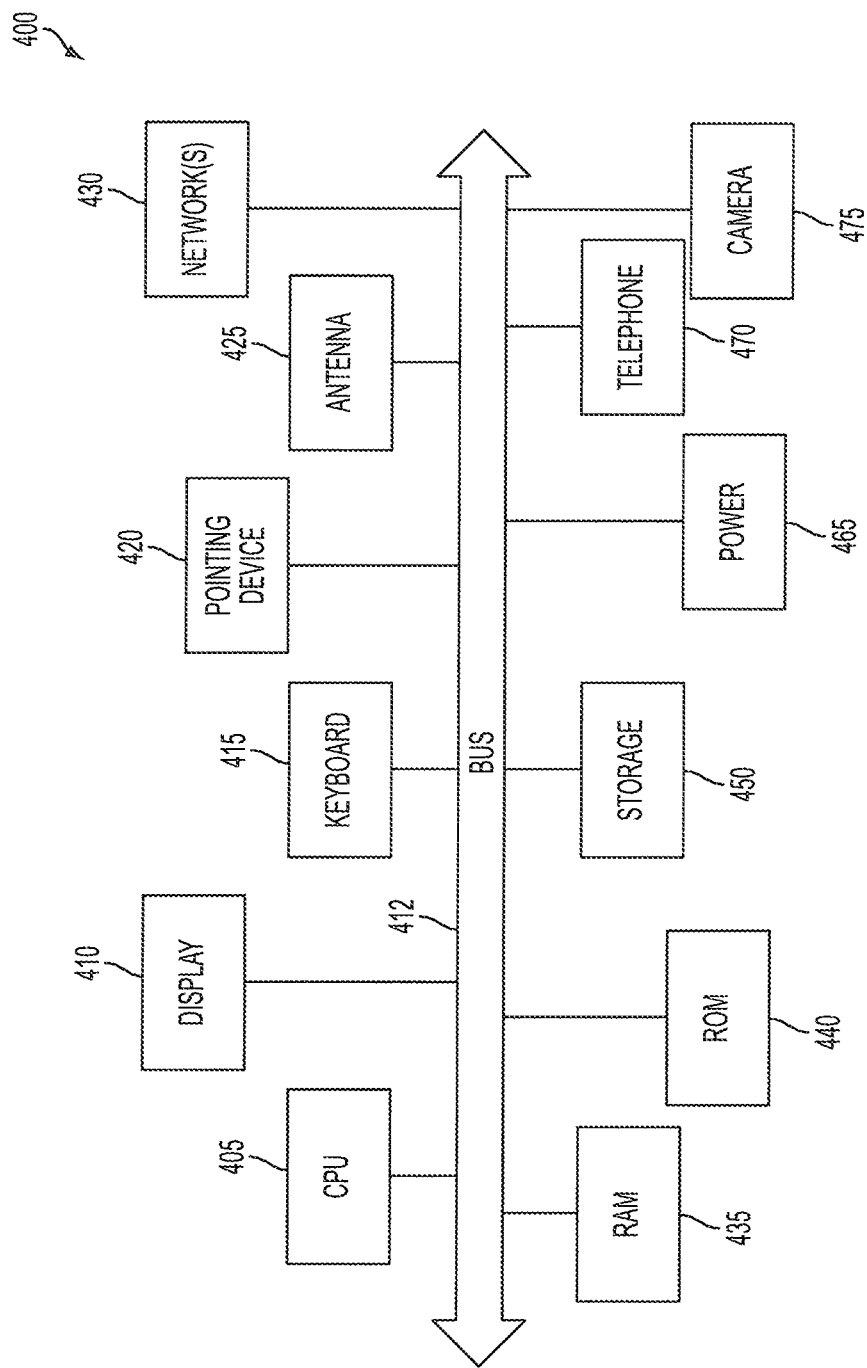
FIG. 4 shows an example internal architecture of the device according to aspects of the present disclosure.

FIG. 4 is an example block diagram illustrating an internal architecture 300 of the device 105 arranged perform the functions or operations with which the data packet analysis can operate, according to aspects. The architecture can include central processing unit (CPU) 405 where the computer instructions that comprise an operating system or an application are processed, display interface 410 that provides a communication interface and processing functions for rendering video, graphics, images, and texts on display, provides a set of built-in controls (such as buttons, text and lists), and supports diverse screen sizes, keyboard interface 415 that provides a communication interface to keyboard, pointing device interface 420 that provides a communication interface to pointing device, antenna interface 425 that provides a communication interface to antenna, one or more network connection interfaces 430 that provides a communication interface to one or more networks over computer network connection, random access memory (RAM) 435 where computer instructions and data are stored in a volatile memory device for processing by CPU 405, read-only memory (ROM) 440 where invariant low-level systems code or data for basic system functions such as basic input and output (I/O), startup, or reception of keystrokes from keyboard are stored in a non-volatile memory device, storage medium 450 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system, application programs including, for example, web browser application, email application, and data files are stored, power source 465 that provides an appropriate alternating current (AC) or direct current (DC) to power components, telephony subsystem 470 that allows the device to transmit and receive sound over a telephone network, and bus 412 that allows communication among the various components of device.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or More" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of controlling network access on a user mobile computing device, the method comprising:
   receiving, at a network layer of a protocol stack of a mobile computing device comprising two or more communications interfaces, one or more data packets from an application executing on the mobile computing device, wherein the two or more communication interfaces comprise a cellular communication interface and a wireless network interface;
   identifying, at the network layer upon receiving the one or more data packets, one or more rules that specify at least one of a plurality of networks to utilize to transmit the one or more data packets, wherein the one or more rules are based on at least two of:
      a type of the at least one of the plurality of networks,
      an operating state of the user mobile computing device, and
      the application executing on the user mobile computing device;
   based on the one or more rules, selecting, at the network layer, a communication interface from the two or more communications interfaces associated with the at least one of the plurality of networks for transmitting the one or more data packets; and
   transmitting the one or more data packets over the at least one of the plurality of networks selected by the user mobile computing device,
   wherein the one or more rules comprise a bandwidth on the communication interface, a time to send the data packet, a delay or an estimated delay, a power consumption required, a cost to send the data packet, a bandwidth quota remaining with a service provider, an accumulated cost on a given account, an exclusion of specific times and dates, a battery life remaining on a device, an estimated time until a user next interacts with the device, and/or a transmission cost per byte.

2. The method according to claim 1, wherein the receiving is performed upon each occurrence of the application executing on a mobile user computing device.

3. The method according to claim 1, further comprising defining a routing table, wherein the routing table is operable to match the one or more data packets with one of the plurality of networks on which the data packets can be transmitted.

4. The method according to claim 1, further comprising modifying a routing table based the one or more rules stored in a rules engine.

5. The method according to claim 1, wherein the plurality of networks comprises wireless local area networks (WLAN), wireless metropolitan area network (WMAN), and wireless wide area networks (WWAN).

6. The method according to claim 5, wherein the wireless local area networks (WLAN) comprises access technologies using Wi-Fi.

7. The method according to claim 5, wherein the wireless metropolitan area network (WMAN) comprise access technologies using WiMAX.

8. The method according to claim 5, wherein the wireless wide area networks (WWAN) comprises access technologies using cellular technologies, wherein the cellular technologies comprise GSM/GPRS EDGE, UTMS, HSPA, CDMA, and WCDMA.

* * * * *